US011959630B2

(12) United States Patent
Høyer

(10) Patent No.: US 11,959,630 B2
(45) Date of Patent: Apr. 16, 2024

(54) LIGHTING DEVICE WITH MOTORISED COLLIMATION CONTROL

(71) Applicant: SGM Light A/S, Aarhus V (DK)

(72) Inventor: Olga Høyer, Aarhus V (DK)

(73) Assignee: SGM LIGHT A/S, Aarhus (DK)

( * ) Notice: Subject to any disclaimer, the term of this patent is extended or adjusted under 35 U.S.C. 154(b) by 0 days.

(21) Appl. No.: 17/633,468

(22) PCT Filed: Aug. 7, 2020

(86) PCT No.: PCT/EP2020/072243
§ 371 (c)(1),
(2) Date: Feb. 7, 2022

(87) PCT Pub. No.: WO2021/023861
PCT Pub. Date: Feb. 11, 2021

(65) Prior Publication Data
US 2022/0282852 A1 Sep. 8, 2022

(30) Foreign Application Priority Data
Aug. 8, 2019 (DK) .......................... PA 2019 70500

(51) Int. Cl.
*F21V 7/00* (2006.01)
*F21V 7/05* (2006.01)
(Continued)

(52) U.S. Cl.
CPC .............. *F21V 7/0041* (2013.01); *F21V 7/05* (2013.01); *F21V 7/06* (2013.01); *F21V 14/04* (2013.01);
(Continued)

(58) Field of Classification Search
CPC . F21V 7/0041; F21V 7/05; F21V 7/06; F21V 14/04; F21V 7/0008; F21V 7/0033;
(Continued)

(56) References Cited

U.S. PATENT DOCUMENTS 4,037,096 A * 7/1977 Brendgord ............ F21V 7/0008 362/294
4,617,619 A * 10/1986 Gehly ....................... F21V 7/24 362/302
(Continued)

FOREIGN PATENT DOCUMENTS

CN 102016392 A 4/2011
CN 203836855 U 9/2014
(Continued)

OTHER PUBLICATIONS

International Search Report and Written Opinion of International Searching Authority for Application No. PCT/EP2020/072243, dated Oct. 19, 2020 (11 pages).
(Continued)

*Primary Examiner* — Tsion Tumebo
(74) *Attorney, Agent, or Firm* — Ice Miller LLP; Justin D. Swindells

(57) ABSTRACT

A lighting device for professional illumination. The device includes a main housing having a front opening, a first light source, a first reflector configured to receive at least a portion of light emitted by the first light source and to reflect at least a portion thereof, and a second reflector configured to receive at least a portion of light reflected by the first reflector and to reflect at least a portion thereof. The lighting device is configured to emit at least a portion of light reflected by the second reflector out of the lighting device through the front opening. The lighting device further includes an actuator configured to move the first reflector or the second reflector in relation to each other in response to a predetermined control signal.

17 Claims, 6 Drawing Sheets

(51) Int. Cl.

| | |
|---|---|
| ***F21V 7/06*** | (2006.01) |
| ***F21V 14/04*** | (2006.01) |
| ***F21W 131/406*** | (2006.01) |
| ***F21Y 115/10*** | (2016.01) |

(52) U.S. Cl.
CPC .... *F21W 2131/406* (2013.01); *F21Y 2115/10* (2016.08)

(58) Field of Classification Search
CPC . F21V 21/30; F21V 7/0016; F21W 2131/406; F21Y 2115/10
See application file for complete search history.

(56) References Cited

U.S. PATENT DOCUMENTS

| | | | | |
|---|---|---|---|---|
| 5,582,480 | A * | 12/1996 | Zwick | F21S 43/31 362/329 |
| 6,893,140 | B2 * | 5/2005 | Storey | F21V 13/04 362/346 |
| 8,456,568 | B2 | 6/2013 | Wendt | |
| 11,566,782 | B2 * | 1/2023 | Christensen | F21V 31/03 |
| 2003/0184999 | A1 | 10/2003 | Neiser | |
| 2007/0069580 | A1 | 3/2007 | Ohshio | |
| 2008/0055918 | A1 | 3/2008 | Mascadri | |
| 2013/0208495 | A1 | 8/2013 | Dau | |
| 2015/0167934 | A1 | 6/2015 | Noeth | |
| 2017/0299146 | A1 * | 10/2017 | Meerbeek | H05B 47/19 |
| 2022/0275926 | A1 * | 9/2022 | Li | F21V 7/00 |

FOREIGN PATENT DOCUMENTS

| | | | |
|---|---|---|---|
| DE | 2535556 | A1 | 2/1976 |
| EP | 2199664 | A1 | 6/2010 |
| EP | 2863112 | A1 | 4/2015 |
| EP | 3273153 | A1 | 1/2018 |
| GB | 2337322 | A | 11/1999 |
| JP | 2018041623 | A | 3/2018 |

OTHER PUBLICATIONS

Danish Patent and Trademark Office, Examination Report for Patent Application No. PA 2019 70500, dated Feb. 21, 2020 (8 pages).
First Office Action for Chinese Patent Application No. 202080065475.2, dated Dec. 5, 2023, with English translation.

* cited by examiner

LIGHTING DEVICE WITH MOTORISED COLLIMATION CONTROL

CROSS-REFERENCE TO RELATED APPLICATIONS

This application is a U.S. National Stage of International Application No. PCT/EP2020/072243, filed Aug. 7, 2020, which claims the benefit of and priority to Denmark Patent Application No. PA 2019 70500, filed Aug. 8, 2019, both of which are incorporated herein by reference in their respective entireties.

FIELD OF THE INVENTION

The present invention relates generally to a lighting device, e.g. a motorised lighting device, for professional illumination, for example to be used to illuminate a given environment.

BACKGROUND

Lighting devices of various types for professional illumination of a given environment are generally known.

One or more of such lighting devices may e.g. be used to illuminate a stage, area, or other e.g. during events like a music concert, theatre performance, a fashion show, a sporting event, a convention, etc.

One or more of such lighting devices may e.g. also be used to illuminate at least a part of a building, a landmark, a sporting field, a monument, or the like.

Additionally, one or more of such lighting devices may e.g. also be used to illuminate an environment or one or more parts thereof e.g. in connection with an event. This may e.g. include illuminating air by light in particular if the air contains moisture, dust, smoke, or other.

The one or more lighting devices may be installed and used more or less permanently or for a longer period of time, e.g. for illumination of a building, landmark, or the like, or for a shorter period of time, e.g. for illumination of an environment or parts thereof, a stage during a concert, sporting event, or the like.

In general, one or more of such professional lighting devices may be used to illuminate, either permanently or temporarily, basically any environment and/or object(s) or parts thereof.

Professional lighting devices normally have some characteristics that set them further apart (than just being of another use) from lighting devices for personal/home use, such as one or more of minimum durability, illuminance and luminous emittance, reliability, water and/or dust protection or resistance, etc. A professional lighting device may e.g. have an Ingress Protection (IP) code of 55 or more enabling it to readily be used in humid conditions, outside during poor weather conditions like rain or fog, in connection with special effects involving water (e.g. for a music concert, a movie location, etc.), and/or the like.

Lighting devices are known which comprise a light source that can be moved in more or less any desired orientation, so that a light beam emitted by a light source can be directed along basically any desired direction (there may be one or more 'dark' or 'blind' spots or areas but then normally of no practical consequence given a sufficient distance between the lighting device and the environment to be illuminated).

To this end, the light source may be supported by the lighting device and may be rotated about one or two axes typically by use of suitable motors or similar as generally known.

Such lighting devices are within the professional lighting segment sometimes referred to as moving heads.

They are during use normally placed on a substantially flat or horizontal surface or suspended from or mounted on an appropriate frame, rack, stand, support, or the like.

The illumination need not only be static (although it can be) but may also be dynamic, e.g. as sometimes used during concerts, sporting events, etc., where the light source(s) of the lighting device(s) is/are moved over time in a controlled and/or pre-determined or programmed manner.

The illumination may also display effects such as a diffusion, spreading, collimation, etc. of the light emitted by the lighting device. Creating such static effects is desirable in some instances, and being able to do so in a dynamic manner would be particularly desirable.

Furthermore, colour wheels with colour filters of various colours, gobos (see later), etc. may also be used to change or influence the emitted light (e.g. the colour of it, the light pattern being emitted, etc.).

It is not uncommon for typical professional use to involve several lighting devices, e.g. also of different types, to be able to produce complex effects. Having to involve more lighting devices increases the complexity of the required setup e.g. both in relation to placement of the devices but also to power and/or data signal connections. An overall power consumption also typically increases with the number of used lighting devices.

In relation to such lighting devices, there is a need for a professional lighting device enabling visually complex and/or interesting effects.

SUMMARY

An aspect of the invention is defined in claim 1.

Accordingly, in one aspect of the present invention, a lighting device configured for professional illumination is provided where the lighting device comprises: a main housing (also referred to simply as housing) which comprises a front opening, a first light source (also referred to as main or primary light source or simply light source) configured to emit light, a first reflector configured to receive at least a portion of light emitted by the first light source and to reflect at least a portion thereof, a second reflector configured to receive at least a portion of light reflected by the first reflector and to reflect at least a portion thereof. The lighting device is configured to emit at least a portion of light reflected by the second reflector out of the lighting device through the front opening and the lighting device may e.g. be a motorised lighting device. The lighting device further comprises an actuator configured to move the first reflector or the second reflector in relation to each other thus changing the properties of the light emitted from the lighting device. The actuator is further configured to move the first reflector or the second reflector in response to a predetermined control signal, which may be received by one or more suitable control unit(s). The predetermined control signal (or another control signal) may also control movement about one or two axes as generally known.

Moving the first and/or the second reflector in relation to each other changes the distance between the first and the second reflector. Different positions of the first reflector and the second reflector in relation to each other affects the light emitted from the lighting device in different ways, allowing for a variety of interesting controllable visual lighting effects.

In some embodiments, the actuator is configured to actively move the second reflector while the first reflector is stationary.

When the second reflector is moved by the actuator, it may be advantageous or even necessary to move the first light source as well depending on the chosen arrangement of the optical components in the lighting device.

In some expedient embodiments, the actuator is configured to actively move the first reflector while the second reflector is stationary. This is advantageous compared to moving the second reflector since the size and weight of the second reflector, at least for some typical professional lighting devices, generally is much larger than the size and the weight of the first reflector. Accordingly, the actuator may be of a relatively simpler design and may e.g. in addition use relatively less power as it needs to move only a smaller sized reflector. In at least some embodiments, a diameter and weight of a second reflector respectively may be about 32 to about 36 centimetres and about 1.5 to about 2 kilograms while a diameter and weight of a first reflector respectively may be about 9 to about 10 centimetres and about 0.04 to about 0.06 kilograms.

In some embodiments, the actuator is a one axis linear actuator, i.e. an actuator configured to move the first reflector (or alternatively the second reflector) along a single predetermined direction or axis.

In principle, the lighting device may alternatively comprise one or more actuators configured to move the first reflector or the second reflector in relation to each other by moving both the first and the second reflectors.

The portion of light emitted out of the lighting device may be collimated or visually collimated. Perfectly collimated light is light having fully parallel rays. A beam of collimated light will therefore be a straight beam with ideally no divergence, but practically speaking with little divergence, i.e. spreading. Thus, the light will only spread out slowly as it travels (as no perfect collimation of light is practically feasible or for lighting devices as disclosed herein practically necessary). Visually collimated light also comprises divergent rays in addition to the parallel rays, but the divergent rays are contained within a straight beam out to a distance. This creates an effect, where the beam appears collimated, i.e. is visually collimated, out to a distance until it spreads out and thereafter appears diffused.

In some embodiments, the actuator, e.g. a linear actuator, is configured to move specifically the first reflector in relation to the second reflector along a predetermined direction, such as a longitudinal direction L of the housing where the actuator is configured to move the first reflector (while the second reflector is kept stationary) in response to the predetermined control signal. Moving the first reflector by the actuator in relation to the second reflector (rather than moving the second reflector in relation to the first reflector) enables as mentioned a simpler design.

In at least some typical embodiments, the lighting device is used for illumination of an environment and the first light source may predominately emit visible light, i.e. light having wavelength between approximately 380 nm and approximately 740 nm.

In some embodiments, the second reflector is a concave reflector or a substantially parabolic reflector.

In some embodiments, the first reflector is a convex reflector. Alternatively, the first reflector may be a plane mirror.

In some embodiments, the second reflector comprises a reflector opening. In these embodiments, the first light source and the second reflector may be arranged such that at least a portion of light emitted by the first light source can travel through the reflector opening (of the second reflector) before being received by the first reflector. This may readily allow for an overall simpler design of the lighting device.

In embodiments where light emitted by the first light source travels through a reflector opening in the second reflector and it is the second reflector that actively is moved in relation to the first reflector, it may be advantageous or even necessary to also move the first light source so as to maintain the relevant properties of the light travelling through the reflector opening. In other embodiments, where light emitted by the first light source travels through a reflector opening in the second reflector, it is not necessary to move the first light source, when moving the second reflector, as other optical components may be used to maintain the relevant properties of the light travelling through the reflector opening as is generally known. A single actuator may move both the first light source and the second reflector or more than one actuator may be used for the purpose of moving both the first light source and the second reflector.

In embodiments where light emitted by the first light source travels through a reflector opening in the second reflector and it is the first reflector that actively is moved in relation to the second reflector, it generally is not necessary to also move the first light source or otherwise arrange for components maintaining the relevant properties of the light travelling through the reflector opening, which greatly simplifies the design and operation of the lighting device; at least if sufficient control and/or calibration for the focal point of the first light source (and its optical system if present) in relation the location of the second reflector (within certain tolerances) is established, e.g. the focal point is established appropriately near the reflector opening of the second reflector.

In some embodiments, the reflector opening comprises an aperture fitting or the like configured to fit into the reflector opening of the second reflector, wherein the aperture fitting is configured to allow light from the first light source to pass through the second reflector towards the first reflector. The aperture of the aperture fitting or the like may e.g. be a hollow cylinder e.g. located centrally in the aperture fitting and/or at least being optically aligned with the first light source. The aperture fitting may e.g. comprise a disc or other part shaped (e.g. being circular) to fit the reflector opening. Alternatively, the aperture fitting is simply a disc with an (e.g. central) opening but it would reduce stray light less than the illustrated embodiment.

Accordingly, the aperture fitting or the like efficiently acts as a shield, barrier, or blocker for stray light from the first light source thereby efficiently preventing stray light from passing through the reflector opening of the second reflector, past the (edge of the) first reflector, and outside the housing of the lighting device at angles (significantly) bigger than the otherwise produced (e.g. or preferably collimated or visually collimated) light beam exiting the housing. Such stray light (or 'false' light) outside the housing of the lighting device would reduce the perception or impression for observers of contrast between the produced (e.g. or preferably collimated or visually collimated) light beam and its surroundings thereby detrimentally reducing the perception or impression of the light intensity of the produced collimated or visually collimated light beam.

In some further embodiments, an inner surface (or at least a part thereof) of the aperture fitting comprises or has anti-reflective properties, e.g. due to being coated or covered in an anti-reflective material and/or due to comprising an exterior providing anti-reflective properties. This will reduce stray light even further. The inner surface of the aperture fitting may e.g. comprise a suitable embossed or debossed pattern such as a number of grooves, etc. to facilitate or provide antireflective properties.

In some embodiments, the actuator comprises a spindle, a spindle shaft, or other connecting element connected to the first reflector wherein movement (by the actuator) of the spindle, spindle shaft, or other connecting element causes movement of the first reflector and wherein the first reflector further comprises a cap unit arranged (e.g. centrally in and) through the first reflector and wherein the cap unit is configured to receive at least a part (e.g. an end) of the spindle, spindle shaft, or other connecting element when the first reflector is moved at or near a first end position (e.g. the end position where the first and the second reflectors are furthest possibly away from each other).

This allows for a greater travel or movement distance of the first reflector (as the spindle, etc. can move through the first reflector) without increasing the overall length or size of the actuator or movement arrangement.

In some further embodiments, an outer surface, or at least a part thereof, of the cap unit comprises reflective properties e.g. due to being coated or covered in a reflective material and/or due to comprising an exterior providing reflective properties.

In some embodiments, the actuator is supported in the main housing by a number, e.g. three, four, or another number, of radially extending ribs. In some alternative embodiments, the main housing comprises a transparent front cover arranged within the front opening and the actuator is held in place by or at the front cover.

In some embodiments, the first reflector has a reflecting surface configured to reflect at least a portion of light emitted by the first light source (when received by the first reflector) and/or the second reflector has a reflecting surface configured to reflect at least a portion of light reflected by the first reflector (when received by the second reflector).

In some embodiments where the first reflector has a reflecting surface configured to reflect at least a portion of light emitted by the first light source and the actuator is configured to move the first reflector, the actuator is located 'behind' and/or on the other side of the reflecting surface of the first reflector, i.e. the first reflector is located between the first light source and the actuator. In at least some further embodiments, the actuator is located adjacent to the first reflector, but the actuator may also be located further away from the first reflector and the actuator may comprise one or more elements for acting on the first reflector so as to be able to move the first reflector in relation to the second reflector.

In some embodiments where the second reflector has a reflecting surface configured to reflect at least a portion of light reflected by the first reflector and the actuator is configured to move the second reflector, the actuator is located 'behind' and/or on the other side of the reflecting surface of the second reflector, i.e. the actuator is located between the first light source and the second reflector. In at least some further embodiments, the actuator is located adjacent to the second reflector, but the actuator may also be located further away from the second reflector and the actuator may comprise means for acting on the second reflector so as to be able to move the second reflector in relation to the first reflector.

In some embodiments, the main housing has a generally longitudinal direction L. The light emitted from the lighting device by the first light source may e.g. be a focused light beam substantially being parallel to the longitudinal direction L, e.g. deviating maximally only about 0.5°-1.0° from the longitudinal direction L, at least up to a certain predetermined distance.

In some embodiments, the actuator is configured to, e.g. or preferably linearly, move the first reflector (or alternatively the second reflector) along the generally longitudinal direction L.

In some embodiments, the lighting device further comprises a separate secondary light source arranged centrally or substantially centrally at the front opening.

In at least some further embodiments, the first light source and the separate secondary light source will be of different types. Both the first and the separate secondary light source may e.g. each be an LED-based light source, e.g. white, colour, or colour-changing. In some embodiments, the separate secondary light source is e.g. a strobe light (or a light source programmed or controlled to function as a strobe light) or other effect providing light source. In particular the combination of an LED-based light source, or other 'normal' light source, and a (e.g. also LED-based) strobe light enables fairly complex and interesting effects, e.g. if used to illuminate air containing particles such as dust, water droplets, smoke, etc. In at least some embodiments, the first light source and the separate secondary light source are able to be controlled independently by a (one or more) suitable control unit allowing for complex lighting effects.

In this way, a compact lighting device, comprising (at least) a first and a secondary light source, is provided enabling complex lighting effects. Furthermore, power consumption is reduced compared to having a plurality of lighting devices otherwise needed to produce the same or corresponding effects, if even able.

In at least some embodiments and as disclosed herein, the provision of the separate secondary light source at the front opening will not adversely influence, at least in a significant way, the emitted light provided by the first light source, e.g. due to an actual distance between the lighting device and the environment to be illuminated and/or in particular if another part of the lighting device already is present at or near this location, e.g. a first reflector.

In some embodiments, the lighting device has an Ingress Protection (IP) code of 55 or more. A device having an IP code of 55 is a device which is dust protected and is protected against water jets. In more detail, ingress of dust is not entirely prevented, but dust does not enter in a sufficient quantity to interfere with satisfactory operation of the device. Complete protection against contact is ensured. Furthermore, water projected by a nozzle (6.3 mm) against an enclosure of the device from any direction does not have any harmful effects.

In some embodiments, the secondary light source is arranged in a separate housing being smaller than the front opening in a transverse direction of the main housing, i.e. an exterior (e.g. the diameter) of the separate housing is smaller in radial extent than an exterior (e.g. the diameter) of the front opening. This readily allows the light emitted by the first light source to exit the lighting device with no or little perceivable adverse effect. In some embodiments, the diameter of the separate housing is about 20% to about 30%, e.g. about 25%, of the diameter of the front opening.

In some embodiments, the separate housing is supported in the main housing by a number, e.g. three, four, or another number, of radially extending ribs. The radially extending ribs supporting the separate housing may be the same as or different from the radially extending ribs supporting the actuator. Alternatively, a transparent front cover arranged within the front opening (if present) may be arranged to secure the separate housing.

In some typical embodiments, the first light source, the first reflector, and the second reflector are located inside the housing and substantially centred at a common axis, which allows for compactness in the design of the lighting device. The common axis may be parallel or substantially parallel to the longitudinal direction L.

In some embodiments, the first reflector is located centrally or substantially centrally at the front opening and located between (in the longitudinal direction L) the first light source and the separate secondary light source, where the second reflector is located inside the main housing. This enables a very compact and efficient design of the lighting device.

In some embodiments, the first reflector is located adjacent to the separate secondary light source. This enables emitting a focused light beam (as generated by light emitted by the first light source) where the location of the first reflector does not cause perceivable additional adverse effect to the emitted focused light beam.

In some embodiments, the first light source, the first reflector, and the separate secondary light source are arranged aligned in the longitudinal direction L substantially centrally in the front opening.

In some embodiments, the actuator is located between the first reflector and the separate secondary light source, which may allow for an efficient and compact design. In some embodiments, the actuator is located wholly or partly inside the separate housing.

In some embodiments, the first light source and/or the separate secondary light source is/are an LED array, e.g. white, colour or colour-changing.

In some embodiments, the first light source and the separate secondary light source are controlled to emit a same or at least resembling or corresponding colour. This is particularly useful if the first light source and the separate secondary light source are colour-changing light sources. This will effective hide or at least diminish the perceivable effect of the 'dark' or 'blind' area or spot arising from the location of the first reflector and/or the separate housing at or in the front opening.

In some embodiments, the lighting device further comprises one or more control units configured to independently control the first light source and the separate secondary light source. In some embodiments, the lighting device further comprises one or more control units configured to control the actuator. The control unit(s) controlling the actuator may be the same as or different from the control unit(s) controlling the first light source and/or the separate secondary light source.

In some embodiments, the lighting device is further configured to rotate the main housing about a first and/or about a second axis so that the emitted light beam can be directed in different directions.

DETAILED DESCRIPTION

Various aspects and embodiments of a lighting device configured for professional illumination as disclosed herein will now be described with reference to the figures.

Figure 1:
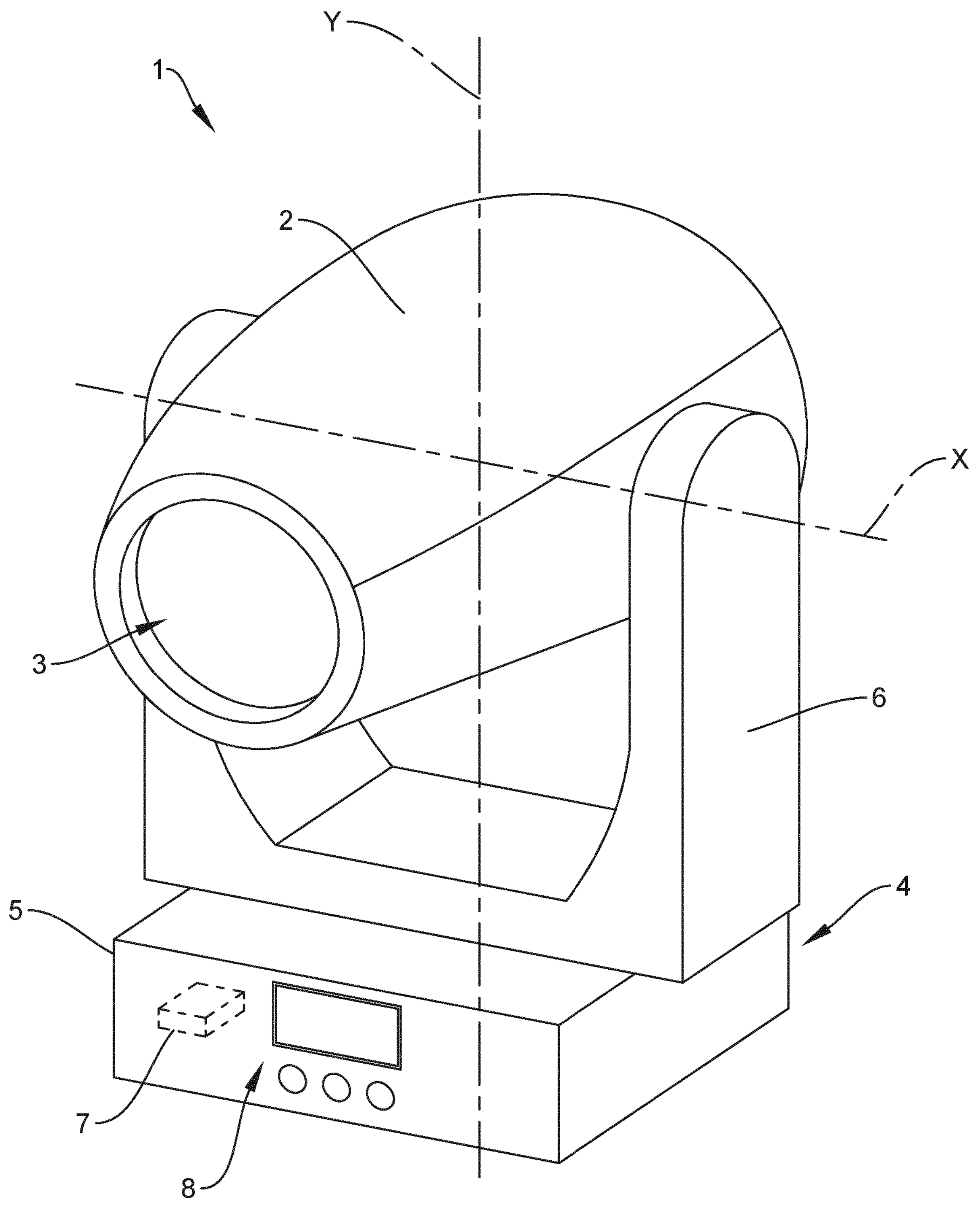
FIG. 1 is a perspective view schematically illustrating one embodiment of a lighting device.

FIG. 1 is a perspective view schematically illustrating one embodiment of a lighting device. FIG. 1 schematically illustrates a lighting device 1 that may be used (e.g. together with one or more additional lighting devices of a same and/or different type(s)) to illuminate a stage, area, or other e.g. during events like a music concert, theatre performance, a fashion show, a sporting event, a convention, etc. One or more of such lighting devices may e.g. also be used to illuminate at least a part of a building, a landmark, a sporting field, a monument, or the like.

The lighting device 1 may also be referred to as a lighting fixture or a projector.

The lighting device 1 comprises a (first) light source (not shown; see e.g. 11 in FIG. 3) configured to emit a light beam in a given direction. The light source may be or comprise a lamp, for example a halogen lamp, a fluorescent lamp, a discharge lamp, or a light source comprising one or more light emission diodes (LEDs). More than one light source can be used in a single lighting device, as typically is the case of a lighting device comprising a plurality of LEDs.

The light source is housed inside a main housing 2, for example made of polymeric material. The housing 2 is provided with a front opening 3 from which the light beam emitted by the light source may exit the lighting device 1. The front opening 3 and/or the interior of the housing 2 may be provided with lenses or other optics in order to control or influence the emitted light beam as generally known.

The housing 2 is, as an example, supported by a support arrangement 4 that can be rested on a generally horizontal or planar surface or used to suspend the lighting device 1 from a fly system of a stage, etc. The support arrangement 4 may comprise a base 5 supporting a movable supporting element 6. In the embodiment shown in FIG. 1, the movable supporting element 6 is generally U-shaped or shaped as a yoke or similar. However, other shapes of the movable supporting element 6 are also possible.

The base 5 and/or the movable supporting element 6 typically houses at least one control unit 7 or similar for controlling operation of the lighting device 1. A user may interact with the control unit(s) 7 through a user interface 8, e.g. comprising a plurality of push-buttons, knobs, a display, and/or other user interface elements, e.g. provided on the base 5 and/or the movable supporting element 6. Alternatively or in addition, a user may interact with the control unit(s) 7 through remote control.

The housing 2 may be rotated about a predetermined axis X preferably being an at least substantially horizontal axis relative to the supporting element 6. This may be done by a given motor of the lighting device 1 e.g. located in one of the 'arms' of the U- or yoke shaped supporting element 6. The motor is preferably an electric motor such as a stepper motor. The rotation about the axis X may alternatively be accomplished using two electrical motors with one motor being located in each 'arm' of the U-shaped supporting element 6. The motor(s) may alternatively be located inside the housing 2.

By rotating the housing 2 about the horizontal axis X, the light source will accordingly be rotated about the horizontal axis X allowing different points or areas to be illuminated with a motion often referred to as a "tilt motion" of the light source.

Furthermore, the supporting element 6 (and thereby the housing 2) may be rotated about a predetermined axis Y (either instead of or in addition to about the axis X) preferably being an at least substantially vertical axis relative to the base 5. This rotation of the supporting element 6 may e.g. be performed by a further motor provided in the supporting element 6, e.g. centrally at the bottom of the U-shape. The motor may as an alternative be located inside the base 5. The further motor is preferably an electric motor, particularly a stepper motor.

By rotating the supporting element 6 about the vertical axis Y, the light source will accordingly be rotated about the vertical axis Y allowing different points or areas to be illuminated. This motion is often referred to as a "pan motion" of the light source.

The motors controlling rotation about the vertical axis Y and/or about the horizontal axis X allows the light source to be positioned in virtually any desired angle both about the horizontal axis X and about the vertical axis Y. The light beam emitted by the light source can thus be controlled to be directed in virtually any desired direction.

The motor(s) may be controlled by the control unit(s) 7.

Figure 3:
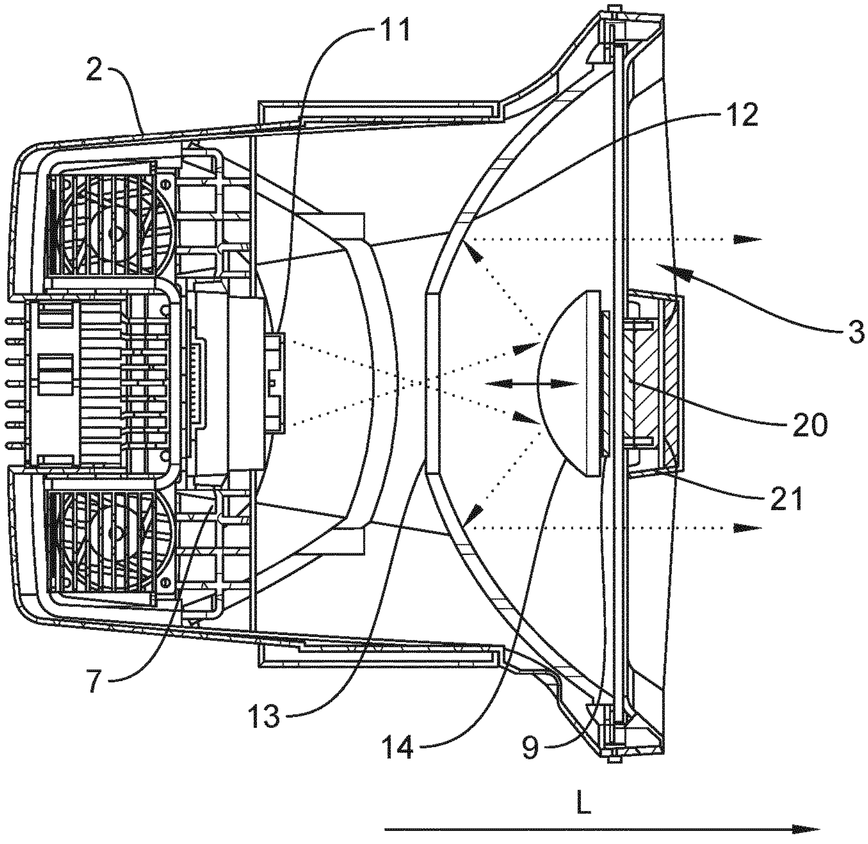
FIG. 3 schematically illustrates a cross-sectional view of the head of a lighting device along section A-A of FIG. 2.
Figure 4:
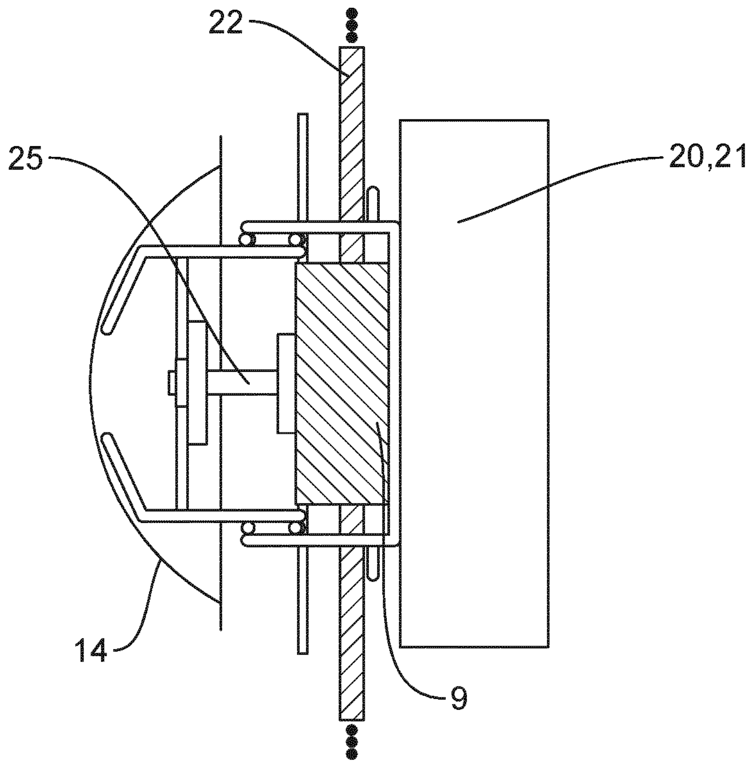
FIGS. 4 and 5 schematically illustrate a cross-sectional view of an actuator for moving a reflector, e.g. the first reflector.
Figure 5:
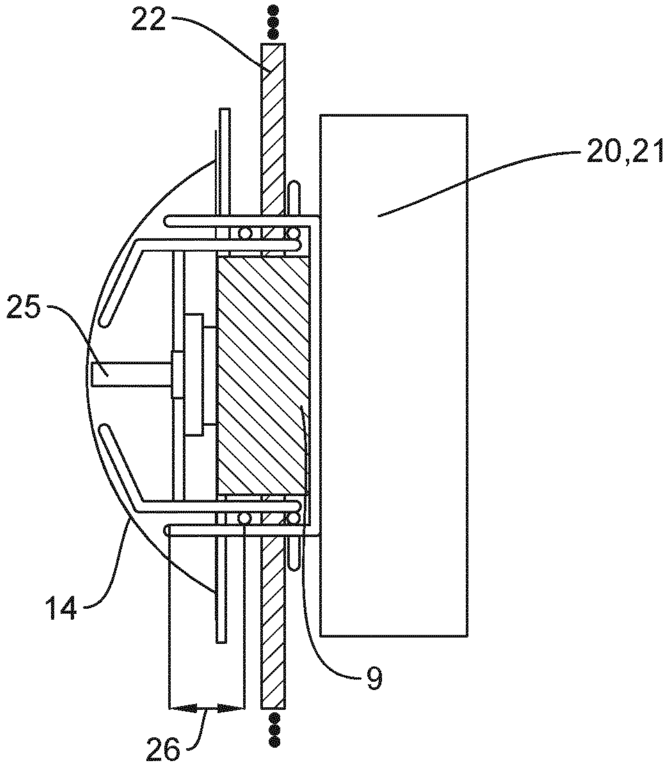

According to an aspect as disclosed herein, the lighting device 1 further comprises an actuator or the like (not shown; see e.g. 9 in FIGS. 4 and 5) as will be illustrated and explained further in connection with FIGS. 3, 4 and 5. The actuator is configured to move a first reflector or a second reflector in relation to each other as disclosed herein. The lighting device 1 is connectable to receive electrical power and/or comprises one or more re-chargeable power sources configured to supply electrical power to the light source(s), the electric motor(s), the control unit(s) 7, the actuator, and/or, if needed, the user interface 8.

Figure 2:
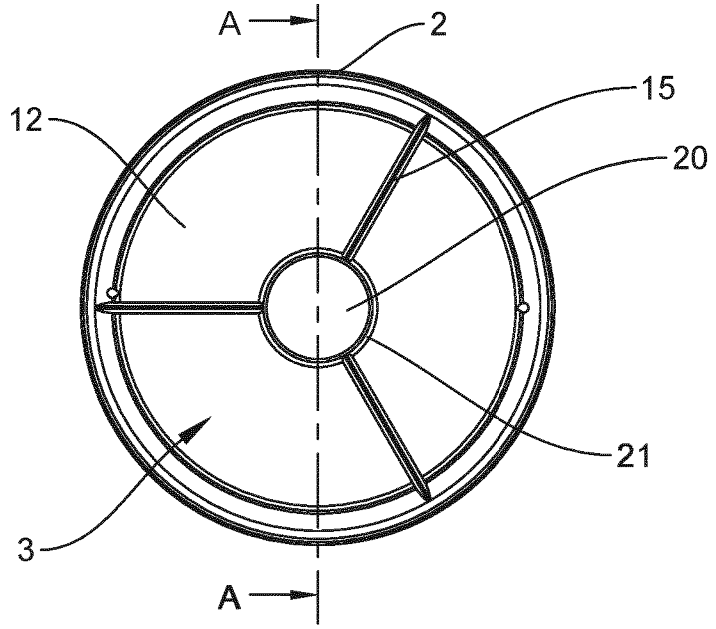
FIG. 2 schematically illustrates a front view of a head of a moving head lighting device, e.g. a lighting device generally corresponding to the one illustrated in FIG. 1 but with a differently shaped head and with additional features.

The lighting device 1 may further comprise a separate secondary light source (not shown; see e.g. 20 in FIGS. 2, 3 and 4) as will be illustrated and explained further in connection with FIGS. 2 and 3. The separate secondary light source is separate from the first light source and the separate secondary light source is at least in some embodiments arranged substantially centrally in or at the opening 3.

In some embodiments, the first light source and/or the separate secondary light source is/are an LED array, e.g. white, colour, or colour-changing. The separate secondary light source may in some embodiments be a strobe light or be programmed to function as a strobe light.

FIG. 2 schematically illustrates a front view of a head of a moving head lighting device, e.g. a lighting device generally corresponding to the one illustrated in FIG. 1 but with a differently shaped head and with additional features. Illustrated is a front view of a housing 2 of a lighting device provided with an opening 3 as explained in connection with FIG. 1 and as disclosed herein. Further shown, is a secondary light source 20 being separate from the first or main light source (see e.g. 11 in FIG. 3) that is arranged in a separate housing 21 being smaller than the opening 3. The separate housing 21 (and thereby the separate secondary light source 20) is arranged substantially centrally at or in the opening 3. In the particular shown embodiment, the separate housing 21 is supported in the housing 2 by a number of, here three as an example, radially extending ribs 15. The actuator (not shown; see e.g. 9 in FIGS. 4 and 5) may also be supported by a number of radially extending ribs, which may be the same as or different from the radially extending ribs 15 supporting the separate housing 21. Further indicated is a second reflector 12 as disclosed herein, which will be described in greater detail in connection with FIG. 3, and a cross section line A-A, where FIG. 3 illustrates the lighting device along section A-A.

FIG. 3 schematically illustrates a cross-sectional view of the head of a lighting device along section A-A of FIG. 2. Illustrated is a cross section of a lighting device 1 having a housing 2, a front opening 3, a first or primary light source 11, and an actuator 9. Further illustrated is a longitudinal direction L.

In the shown and corresponding embodiments, the lighting device 1 comprises a first reflector 14 and a second reflector 12 wherein the first reflector 14 is configured to receive at least a portion of light emitted by the first light source 11 and to reflect at least a portion of the received light to the second reflector 12. Additionally, the second reflector 12 is configured to receive at least a portion of light reflected by the first reflector 14 and to reflect at least a portion of the received light out through the opening 3. Further, in the shown embodiment, the first reflector 14 is a convex reflector and the second reflector 12 is a concave reflector.

Examples of paths of light are indicated with arrows having dotted lines.

The first reflector 14 is in the shown and corresponding embodiments located substantially aligned with the centre of the front opening 3 and furthermore between the first light source 11 and actuator 9 while the second reflector 12 is located inside the housing 2. The second reflector 12 comprises a reflector opening 13 and the first light source 11 and the second reflector 12 are arranged such that at least a portion of light emitted by the first light source 11 can travel through the reflector opening 13 before being received by the first reflector 14. In some embodiments, the reflector opening 13 may in some further embodiments comprise an aperture fitting or the like (not shown; see e.g. 13A in FIGS. 8A, B, D, and F for an example) rather than just being a simple or simpler opening.

In the embodiment shown in FIG. 3, the lighting device 1 comprises a separate secondary light source 20, which is located in a separate housing 21. The actuator 9 is located between the first reflector 14 and the separate secondary light source 20/the separate housing 21. Also shown in the embodiment in FIG. 3, is the actuator 9 being located behind/opposite the reflecting surface of the first reflector 14, i.e. on the side of the first reflector 14, which does not reflect light received from the first light source 11. More specifically, the actuator 9 is located between the first reflector 14 (at or near the non-reflecting side of the first reflector 14) and the separate housing 21 of the secondary separate secondary light source 20.

By moving the first reflector 14 in relation to the second reflector 12 along a predetermined direction, such as the longitudinal direction L as shown and indicated by the double-arrow at the first reflector 14, i.e. closer to or further from the second reflector 12, the emitted light exiting the opening 3 can be made, by appropriately setting the distance e.g. to be within a predetermined interval between the first and the second reflector, to be a collimated or visually collimated light beam being substantially parallel to the longitudinal direction L (indicated by the arrow at the bottom of the Figure). The produced light beam will thereby appear collimated, i.e. be visually collimated, out to a distance after which it spreads out and appears diffused. Changing the distance between the first reflector 14 and the second reflector 12 will change the distance out to which the beam is visually collimated, as is illustrated and explained further in connection with FIG. 6. The actuator 9 is in the particular shown embodiment configured to move the first reflector 14 in relation to the second reflector 12 (by moving the first reflector 14 while the second reflector 12 is stationarily fixed) in response to a predetermined control signal provided by at least one control unit or similar 7. Accordingly, the movement (and thereby the resulting emitted light) may be controlled, e.g. according to a program, sequence, etc., to create various effects, e.g. as explained in connection with FIGS. 6A to 6C.

Both the first reflector 14 and the separate secondary light source 20 (and advantageously thereby the separate housing 21) are, at least in the shown and corresponding embodiments, circularly shaped as seen in the longitudinal direction L and about the same radial size. The secondary light source 20/the separate housing 21 is smaller than the opening 3 in a transverse direction of the main housing, i.e. the diameter of the separate housing 21 is smaller than the diameter of the opening 3. In some embodiments, the diameter of the separate housing 21 is about 20% to about 30%, e.g. about 25%, of the diameter of the opening 3.

In some embodiments, the first reflector 14 is a convex reflector and/or the second reflector 12 is a substantially parabolic reflector, e.g. a parabolic mirror or the like. Such a suitable parabolic reflector can produce light rays substantially parallel with the longitudinal direction L. Accordingly, the light source 11, the first reflector 14, and the separate secondary light source 20 are arranged aligned in the longitudinal direction L substantially centrally at the front opening 3.

The presence and location of the first reflector 14 will produce a 'dark' or 'blind' area or spot in the opening 3. However, the effect of this is increasingly reduced with increasing distance from the lighting device 1. Additionally, placing the separate secondary light source 20 adjacent to the first reflector 14 and further in the longitudinal direction L than the first reflector 14 (i.e. the separate secondary light source 20 is located closer to the opening 3 than the first reflector 14) enables the provision of the separate secondary light source 20 without further detriment as it does not block emitted light more than what the first reflector 14 already would do alone. The first 11 and the secondary 20 light source are controlled by at least one control unit or similar (see e.g. 7 in FIGS. 1 and 3) e.g. independently. This enables more diverse light effects using only a single lighting device. The first 11 and the secondary 20 light source can also be controlled to produce interesting and unique light effects. Power and control signals may e.g. be provided to the separate secondary light source 20 and/or the actuator 9 via a suitable cable located along one of the ribs 15.

In some embodiments, the first light source 11 is a white LED light source, e.g. comprising a plurality of LEDs e.g. in the form of an LED array. Alternatively, the first light source 11 may be a coloured or colour-changing LED light source. For white LED light sources, the colour of the emitted light may e.g. be changed by (optional) use of a (potentially interchangeable) colour filter, as generally known.

In some embodiments, the separate secondary lights source 20 is an LED array, e.g. white, colour, or colour-changing.

In some embodiments, the separate secondary light source 20 is a strobe light, a stroboscopic light, or is programmed to function as a strobe or stroboscopic light.

The lighting device 1 may also comprise so-called gobos. A gobo is a physical template that can be placed in front of the light source of the lighting device, or at least in the light propagation path, in order to control the shape of the emitted light beam. A gobo can be conformed as a piece of material with patterned holes through which light can pass, so that the light beam exiting the lighting device forms a desired pattern. A lighting device may comprise a plurality of gobos, each corresponding to a different pattern. A user may select a certain gobo e.g. by using a user interface of the lighting device 1. Thereafter, the control unit will cause the selected gobo to be brought in front of the light source or otherwise in the light propagation path, so that a desired pattern is obtained. The lighting device 1 may alternatively or in addition also comprise one or more controllable colour filters to enable changing the colour of the emitted light.

As an alternative, the second reflector 12 is moved by the actuator 9 in relation to the first reflector 14. In such embodiments, the actuator 9 is typically located elsewhere, e.g. between the first light source 11 and the second reflector 12. In some such further embodiments, the second reflector may be moved together with the first light source in a fixed relationship (i.e. they move fixedly together) and the reflectors are moved in relation to the first light source. However, moving the first reflector 14 by the actuator 9 in relation to the second reflector 12 will typically enable a simpler design amongst other.

FIGS. 4 and 5 each schematically illustrate a cross-sectional view of an actuator 9 for moving the first reflector 14 (where the first reflector 14 is illustrated at two different locations in the Figures). The cross-sectional views both illustrate an embodiment, where the actuator 9 is located between the first reflector 14 and the separate second light source 20/the separate housing 21 (if the lighting devices comprises such) or at least located on the side of the first reflector 14 being furthest away from the first light source (see e.g. 11 in FIG. 3). Further shown, is a transparent front cover 22, e.g. arranged in the main housing (not shown, see e.g. 2 in FIG. 3) within a front opening (not shown, see e.g. 3 in FIG. 3), where the actuator 9 is held in place by or at the front cover 22. In some embodiments, the separate second light source 20/the separate housing 21 may be attached to the actuator 9 and/or may hold the actuator 9 and first reflector 14 in place in relation to the housing of the lighting device. In some embodiments, the transparent front cover 22 is secured directly to the main housing. Alternatively, it may be secure to at least some of the radially extending ribs (see e.g. 15 in FIG. 2) if present.

Different types of actuators may be used as is generally known. The actuator 9 may e.g. be a (one axis) linear actuator e.g. comprising a stepper motor or the like. The actuator 9 may e.g. (as also shown) comprise a spindle, a spindle shaft, or the like 25 connected with a controlling drive unit 9, e.g. a stepper motor or the like, where movement of the spindle, etc. 25 causes the movement of the first reflector 14.

In FIG. 4, the actuator 9 has moved the first reflector 14 linearly in a predetermined direction away from the front cover 22 and the separate second light source 20, whereas in FIG. 5 the first reflector 14 has been moved linearly closer to the front cover 22 and the separate second light source 20.

In an embodiment such as the one shown in FIG. 3 or corresponding embodiments, the first reflector 14 would be closer to the second reflector 12 in the position shown in FIG. 4 than in the position shown in FIG. 5. The actuator 9 and overall design of the lighting device 1 may allow for numerous positions of the first reflector 14 in relation to the second reflector (not shown, see e.g. 12 in FIG. 3). The travelled distance of the first reflector 14 between the situation of FIG. 4 and FIG. 5 is indicated by the double arrow 26.

In the illustrated situation of FIG. 5 it can be seen that one end (the one closest to the first reflector 14) of the spindle, etc. 25 is very near or almost touches the (non-reflective) surface of the first reflector 14.

To allow for an increase of the possible travel distance 26 without increasing the overall length of the arrangement, the length of the spindle, etc. 25 could be increased and the first reflector 14 could comprise an opening allowing the spindle, etc. 25 to extend through it. An exemplary embodiment of such an arrangement (comprising a cap unit or similar) is illustrated in FIGS. 8C-8F.

Figure 6A:
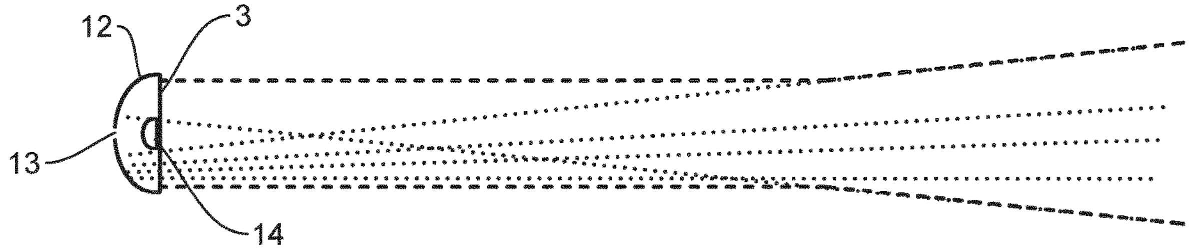
FIGS. 6A, 6B, and 6C schematically illustrate the effect movement of the first reflector can have on light emitted by the lighting device as disclosed herein according to some embodiments.
Figure 6B:
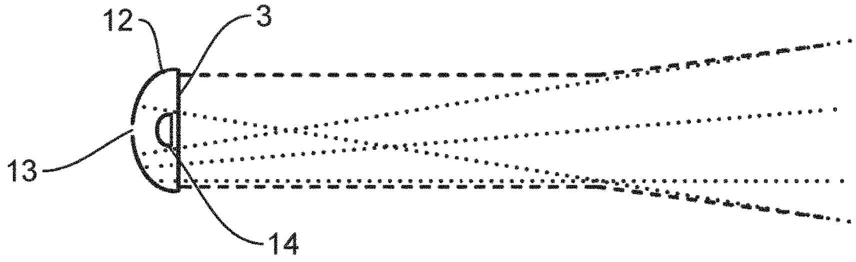
Figure 6C:
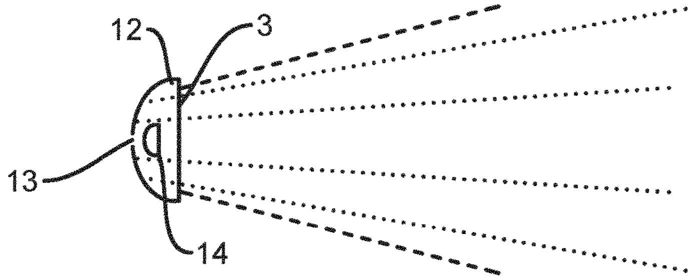

FIGS. 6A, 6B, and 6C schematically illustrate the effect movement of the first reflector 14 can have on light emitted by the lighting device (not shown, see e.g. 1 in FIGS. 1 and 3) as disclosed herein according to some embodiments. In the illustrated embodiment, the second reflector 12 has a reflector opening 13 through which light from the first light source enters before at least a portion of it is received by the first reflector 14. The first reflector 14 reflects at least a portion of the received light to the second reflector 12. The second reflector 12 receives at least a portion of light reflected by the first reflector 14 and reflects at least a portion of the received light out through a front opening 3 of the lighting device. As disclosed herein, an actuator (not shown, see e.g. 9 in FIGS. 3, 4 and 5) can move the first reflector 14 or the second reflector 12 in relation to each other such that the distance between the first reflector 14 and the second reflector 12 increases or decreases. Exemplary paths of light reflected from the second reflector 12 are indicated with dotted lines and the overall visual appearance of the beam is indicated with dashed lines. Only a few representative paths of light are shown so as to aid the understanding without crowding the illustration.

In FIG. 6A, the first reflector 14 and the second reflector 12 are furthest (for the specific embodiment) from each other. The beam emitted from the lighting device is visually collimated out to a predetermined first distance (as determined by the specific configuration and/or design of the lighting device), which may be e.g. about 30 meters or more, after which distance the beam spreads and appears diffused.

In FIG. 6B, the first reflector 14 is closer to the second reflector 12 than in FIG. 6A. The beam emitted from the lighting device is visually collimated out to a predetermined second distance from the lighting device, which is shorter than the distance in FIG. 6A, e.g. about 8-10 meters. At and from a distance from the lighting device greater than the predetermined second distance, the beam spreads and appears diffused.

In FIG. 6C, the first reflector 14 is even closer to the second reflector 12 and is at an extremum, where the beam emitted from the lighting device spreads out immediately upon being emitted from the lighting device.

The distance out to which the beam is visually collimated may be changed dynamically, as the actuator 9 dynamically can move the first reflector 14 or the second reflector 12 in relation to the other, while a beam is being emitted from the lighting device thereby controllably setting a visual collimation distance and/or creating interesting effects. For instance, changing the distance of the first reflector 14 or the second reflector 12 in relation to the other in the order of FIG. 6C to 6A can readily provide a zoom effect of the emitted light beam. Depending on the desired effect, the visual collimation may also be used as a static effect.

The exemplary illustrated positions of the first reflector 14 and the second reflector 12 in relation to each other shown in FIGS. 6A, 6B, and 6C are only illustrative and the relational positions, which achieve the desired lighting effect, will vary depending on a variety of design choices such as e.g. the shape of the first reflector 14 and the shape of the second reflector 12.

Figure 7:
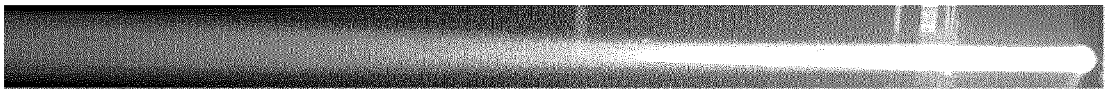
FIG. 7 is a photograph of a visually collimated beam produced by a lighting device as disclosed herein.

FIG. 7 is a photograph of a beam that is visually collimated out to a predetermined distance after which it spread out. The beam is produced by a lighting device corresponding to an embodiment as disclosed herein. In the photograph, the beam is emitted by a lighting device at the right side of the Figure and is visually collimated out to a predetermined distance of about 6 meters from the lighting device.

FIGS. 8A-8F schematically illustrate different aspects of further exemplary embodiments of a lighting device.

Figure 8A:
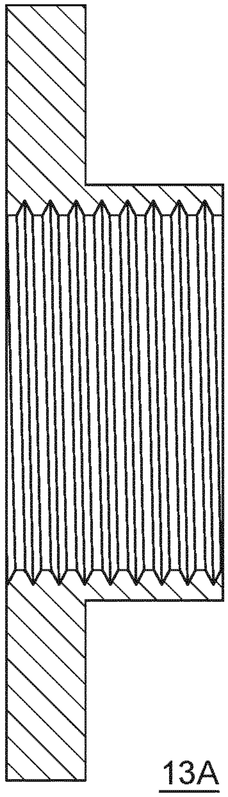
FIGS. 8A-8F schematically illustrate different aspects of further exemplary embodiments of a lighting device.

Illustrated in FIG. 8A is an aperture fitting or the like 13A configured to fit into the reflector opening (not shown; see e.g. 13 in FIGS. 3, 8B, 8D and 8F) of the second reflector (not shown; see e.g. 12 elsewhere). The aperture fitting or the like 13A efficiently acts as a shield, barrier, or blocker for stray light from the first light source (see e.g. 11 elsewhere) and thereby efficiently prevent stray light from passing through the reflector opening of the second reflector, past the edge of the first reflector, and outside the housing of the lighting device at angles (significantly) bigger than the otherwise produced collimated or visually collimated light beam exiting the housing. Such stray light (or 'false' light) outside the housing of the lighting device would reduce the perception or impression for observers of contrast between the produced collimated or visually collimated light beam and its surroundings thereby detrimentally reducing the perception or impression of the light intensity of the produced collimated or visually collimated light beam.

When the first and the second reflector is far or furthest apart (see e.g. FIGS. 3 and 8F) there would otherwise be ample room for such stray light to exit the housing at larger angles.

As an alternative to the illustrated aperture fitting or the like 13A, the aperture fitting could e.g. be a disc with an (e.g. central) opening but it would reduce stray light less than the illustrated embodiment.

In the shown embodiment, the aperture fitting or the like 13A comprises a disc or other part shaped (e.g. being circular) to fit the reflector opening and an aperture configured to allow light from the first light source to pass through the second reflector (towards the first reflector). The aperture of the aperture fitting or the like 13A may e.g. be a hollow cylinder e.g. located centrally in the disc or other part of the fitting 13A and/or at least being optically aligned with the first light source (see e.g. 11 elsewhere).

Figure 8B:
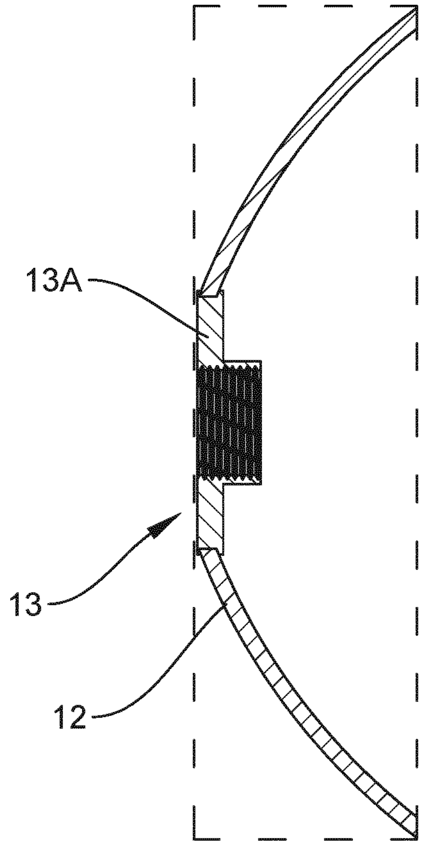

In some further embodiments, an inner surface, or at least a part thereof, of the aperture fitting or the like 13A comprises enhanced or increased anti-reflective properties e.g. due to being coated or covered in an anti-reflective material and/or due to comprising an exterior providing anti-reflective properties, e.g. comprising a suitable embossed or debossed pattern such as a number of grooves (as illustrated in FIG. 8A). FIG. 8B (and 8D and 8F) illustrates the aperture fitting or the like 13A fitting in a reflector opening 13 of a second reflector 12.

Figure 8C:
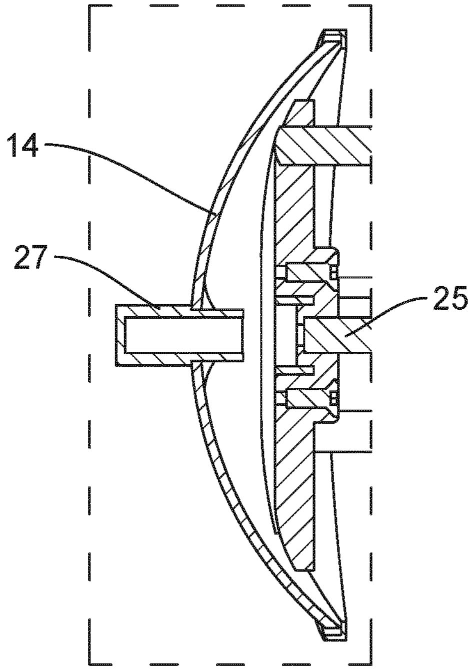

Illustrated in FIG. 8C is a first reflector 14 and a spindle system for an actuator (see e.g. 9 elsewhere) for moving the first reflector 14 in relation to a second reflector (see e.g. 12 elsewhere) all as disclosed herein. The spindle system comprises a spindle, a spindle shaft, or the like 25 as disclosed herein.

In the illustrated and corresponding embodiments, the first reflector 14 further comprises a cap unit, receptacle, or the like 27 arranged centrally in and through the first reflector 14 where the cap unit or the like 27 is configured to receive at least a part of the spindle, etc. 25 (see e.g. also 25 in FIGS. 4 and 5) of the actuator moving the first reflector 14 as disclosed herein. As mentioned, this allows for a greater travel or movement distance of the first reflector 14 (as the spindle, etc. can move through the first reflector 14) without increasing the overall length or size of the actuator or movement arrangement.

In some further embodiments, an outer surface, or at least a part thereof, of the cap unit 27 comprises enhanced or increased reflective properties e.g. due to being coated or covered in a reflective material and/or due to comprising an exterior providing reflective properties.

Figure 8D:
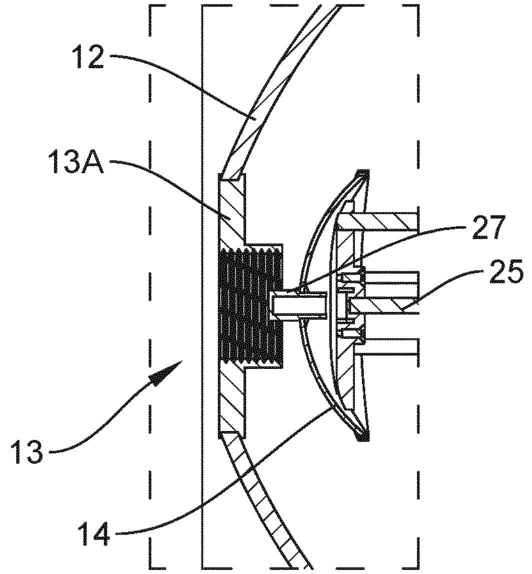

Illustrated in FIG. 8D is a first reflector 14 comprising a cap unit or the like 27 and a second reflector 12 comprising an aperture fitting or the like 13A all according to FIGS. 8A-C.

Figure 8E:
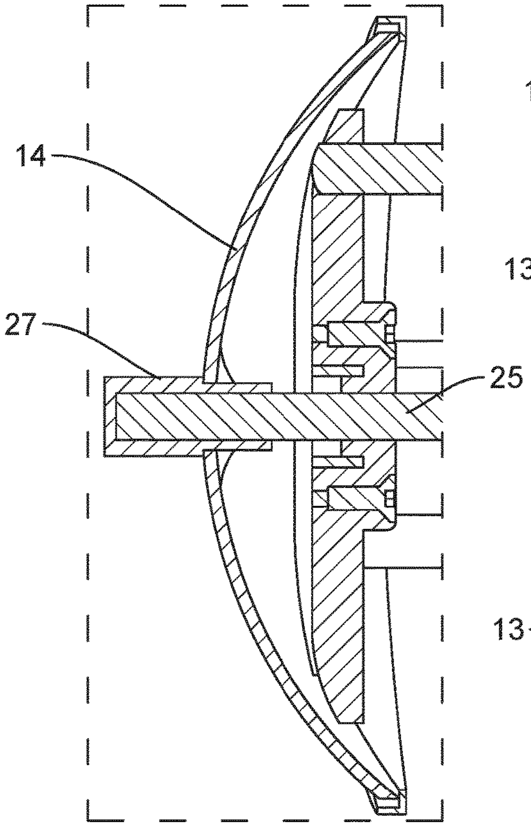
Figure 8F:
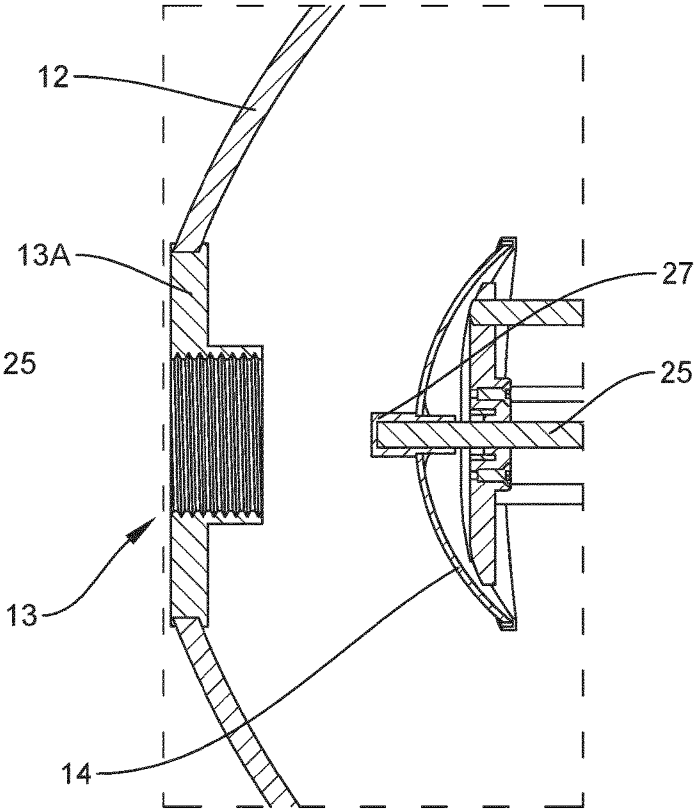

FIGS. 8E and 8F illustrates the first and second reflectors 14, 12 of FIGS. 8C and 8D but in another situation or configuration where the first and the second reflectors 14, 12 have been moved further apart (FIGS. 8E and 8F) compared to the situation or configuration of FIGS. 8C and 8D. FIGS. 8C and 8D correspond to the situation of FIG. 4 while FIGS. 8E and 8F correspond to the situation of FIG. 5. In FIGS. 8E and 8F it can be seen that the spindle, etc. 25 passes through the first reflector 14 and is received by the cap unit or the like 27.

In FIG. 8D it can be seen that (for the illustrated and corresponding embodiments) the cap unit or the like 27 even enters into the aperture fitting or the like 13A when the first and second reflectors 14, 12 are close together.

Some preferred embodiments have been shown in the foregoing, but it should be stressed that the invention is not limited to these, but may be embodied in other ways within the subject matter defined in the claims.

In the claims enumerating several features, some or all of these features may be embodied by one and the same element, component or item. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, elements, steps or components but does not preclude the presence or addition of one or more other features, elements, steps, components or groups thereof.

LIST OF REFERENCES

- 1 Lighting device
- 2 Housing
- 3 Front opening
- 4 Support arrangement
- 5 Base
- 6 Movable supporting element
- 7 Control units
- 8 User interface
- 9 Actuator
- 11 First light source
- 12 Second reflector
- 13 Reflector opening
- 13A Aperture fitting
- 14 First reflector
- 15 Radially extending ribs
- 20 Secondary light source
- 21 Separate housing
- 22 Front cover
- 25 Spindle, etc.
- 26 Travelled distance
- 27 Cap unit
- L Longitudinal direction
- X First axis
- Y Second axis

The invention claimed is:

1. A lighting device configured for professional illumination, the lighting device comprising:

a main housing comprising a front opening, a first light source configured to emit light, a first reflector configured to receive at least a portion of light emitted by the first light source and to reflect at least a portion thereof, a second reflector configured to receive at least a portion of light reflected by the first reflector and to reflect at least a portion thereof, wherein the lighting device is configured to emit at least a portion of light reflected by the second reflector out of the lighting device through the front opening, the lighting device further comprising an actuator configured to linearly move the first reflector in relation to the second reflector along a predetermined direction or along a longitudinal direction, wherein the actuator is further configured to move the first reflector in response to a predetermined control signal, wherein the first reflector has a reflecting surface configured to reflect at least a portion of light emitted by the first light source, and wherein the actuator is arranged on the other side than the reflecting surface of the first reflector, and wherein the first reflector is arranged between the first light source and the actuator.

2. The lighting device according to claim 1, wherein the portion of light emitted out of the lighting device is collimated or visually collimated.

3. The lighting device according to claim 1, wherein the actuator is configured to move the first reflector, or alternatively the second reflector, along a single predetermined direction or axis.

4. The lighting device according to claim 1, wherein the second reflector is a concave reflector or a substantially parabolic reflector.

5. The lighting device according to claim 1, wherein the first reflector is a convex reflector.

6. The lighting device according to claim 1, wherein the first reflector is a plane mirror.

7. The lighting device according to claim 1, wherein the second reflector comprises a reflector opening and wherein the first light source and the second reflector are arranged such that at least a portion of light emitted by the first light source can travel through the reflector opening before being received by the first reflector.

8. The lighting device according to claim 7, wherein the reflector opening comprises an aperture fitting configured to fit into the reflector opening of the second reflector, wherein the aperture fitting is configured to allow light from the first light source to pass through the second reflector towards the first reflector.

9. The lighting device according to claim 8, wherein an inner surface, or at least a part thereof, of the aperture fitting comprises or has anti-reflective properties due to being coated or covered in an anti-reflective material and/or due to comprising an exterior providing anti-reflective properties.

10. The lighting device according to claim 1, wherein the actuator comprises a spindle or a spindle shaft or other connecting element connected to the first reflector wherein movement of the spindle or spindle shaft or other connecting element causes movement of the first reflector and wherein the first reflector further comprises a cap unit arranged through the first reflector wherein the cap unit is configured to receive at least a part of the spindle or spindle shaft when the first reflector is moved at or near a first end position.

11. The lighting device according to claim 10, wherein an outer surface, or at least a part thereof, of the cap unit comprises reflective properties due to being coated or covered in a reflective material and/or due to comprising an exterior providing reflective properties.

12. The lighting device according to claim 1, wherein the actuator is supported in the main housing by a number of radially extending ribs.

13. The lighting device according to claim 1, wherein the main housing comprises a transparent front cover arranged within the front opening and the actuator is held in place by or at the front cover.

14. The lighting device according to claim 1, wherein the actuator is located behind the reflecting surface of the first reflector.

15. The lighting device according to claim 1, wherein the lighting device further comprises a separate secondary light source arranged centrally or substantially centrally at the front opening.

16. The lighting device according to claim 15, wherein the actuator is located between the first reflector and the separate secondary light source.

17. A lighting device configured for professional illumination, the lighting device comprising:

a main housing comprising a front opening, a first light source configured to emit light, a first reflector configured to receive at least a portion of light emitted by the first light source and to reflect at least a portion thereof, a second reflector configured to receive at least a portion of light reflected by the first reflector and to reflect at least a portion thereof, wherein the lighting device is configured to emit at least a portion of light reflected by the second reflector out of the lighting device through the front opening, the lighting device further comprising an actuator configured to move the first reflector or the second reflector in relation to each other, wherein the actuator is further configured to move the first reflector or the second reflector in response to a predetermined control signal, wherein the actuator comprises a spindle or a spindle shaft or other connecting element connected to the first reflector wherein movement of the spindle or spindle shaft or other connecting element causes movement of the first reflector and wherein the first reflector further comprises a cap unit arranged through the first reflector, and wherein the cap unit is configured to receive at least a part of the spindle or spindle shaft when the first reflector is moved at or near a first end position.

* * * * *